(12) United States Patent
Chakraborty et al.

(10) Patent No.: US 10,152,268 B1
(45) Date of Patent: Dec. 11, 2018

(54) SYSTEM AND METHODS FOR REPLICATION RESOURCE MANAGEMENT IN ASYMMETRIC SECURE MULTI-TENANCY DEPLOYMENTS IN PROTECTION STORAGE

(71) Applicant: EMC Corporation, Hopkinton, MA (US)

(72) Inventors: Subhasish Chakraborty, Livermore, CA (US); David Lin, Santa Clara, CA (US); Shufeng Huang, San Jose, CA (US); Terry Hahn, Los Altos, CA (US); Sunil Prabhakar, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 15/085,934

(22) Filed: Mar. 30, 2016

(51) Int. Cl.
*G06F 12/00* (2006.01)
*G06F 3/06* (2006.01)

(52) U.S. Cl.
CPC ............ *G06F 3/065* (2013.01); *G06F 3/0619* (2013.01); *G06F 3/0683* (2013.01)

(58) Field of Classification Search
CPC ....... G06F 3/065; G06F 3/0619; G06F 3/0683
See application file for complete search history.

(56) References Cited

U.S. PATENT DOCUMENTS

| 8,612,696 | B2 | 12/2013 | Zhu et al. | |
|---|---|---|---|---|
| 8,635,184 | B2 | 1/2014 | Hsu et al. | |
| 2014/0173017 | A1* | 6/2014 | Takagi | H04L 67/06 709/213 |
| 2015/0277764 | A1* | 10/2015 | Ehrlich | G06F 3/0616 711/103 |

FOREIGN PATENT DOCUMENTS

WO     2008008183 A2     1/2008

* cited by examiner

*Primary Examiner* — Matthew Bradley
(74) *Attorney, Agent, or Firm* — Womble Bond Dickinson (US) LLP

(57) ABSTRACT

A method for replicating data from a plurality of storage systems to a target storage system. The method implemented at the target storage system receives a replication request to replicate data from a source storage system to the target storage system, where the target storage system stores data replicated from the plurality of source storage systems. In response to the replication request, the target storage system identifies a replication resource limit associated with the data to be replicated from the source storage system. The target storage system then determines whether a replication resource requested by the replication request has exceeded the replication resource limit. The target storage system thus allows the replication resource to replicate data from the source storage system, in response to the replication resource not exceeding the replication resource limit.

15 Claims, 10 Drawing Sheets

US 10,152,268 B1

SYSTEM AND METHODS FOR REPLICATION RESOURCE MANAGEMENT IN ASYMMETRIC SECURE MULTI-TENANCY DEPLOYMENTS IN PROTECTION STORAGE

FIELD OF THE INVENTION

Embodiments of the present invention relate generally to data storage systems. More particularly, embodiments of the invention relate to data replication of data storage systems.

BACKGROUND

Customers utilize backup storage systems to protect data on their computer systems from loss by copying the data of the computer system and storing it at a target storage system. A multi-tenant environment refers to a secure technology where a single target storage system is deployed to serve multiple customers (also referred to as source storage systems), each customer using the same target storage system for their protection storage requirements. Meanwhile, an asymmetric multi-tenant environment refers to a secure technology where a single target storage system, which is multi-tenanted and operated by a service provider, is deployed to serve multiple customers that are not owned by a service provider and not multi-tenanted, where each customer uses the target storage system for their protection storage requirements.

A target storage system, which supports multi-tenants, must satisfy replication resource management requirements. Here, the "replication resource management" refers to the requirements that each tenant must not consume all the replication resources that are shared with other tenants that are also associated with the target storage system. The replication resource management requirements apply to each tenant that requests to replicate data to the target storage system. For example, a customer (e.g., a source storage system, tenant, etc.) must not be able to consume all the resources, or a disproportionately high level of resources at the target storage system, and thereby deny the resources for the other customers associated with the target storage system, and thus result in a shortage of resources that sacrifices the throughput and performance for the other customers.

Therefore, the problems and challenges faced with regard to an asymmetric multi-tenancy environment where multiple customers are replicating data to a single target storage system are time-consuming and cumbersome from a replication resource management perspective as the number of customers and data replication requests increases. Conventional mechanisms are no longer sufficient to satisfy the replication resource utilization concerns of such environments, especially in an asymmetric multi-tenancy environment, and to ensure that replication resource limits are honored.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
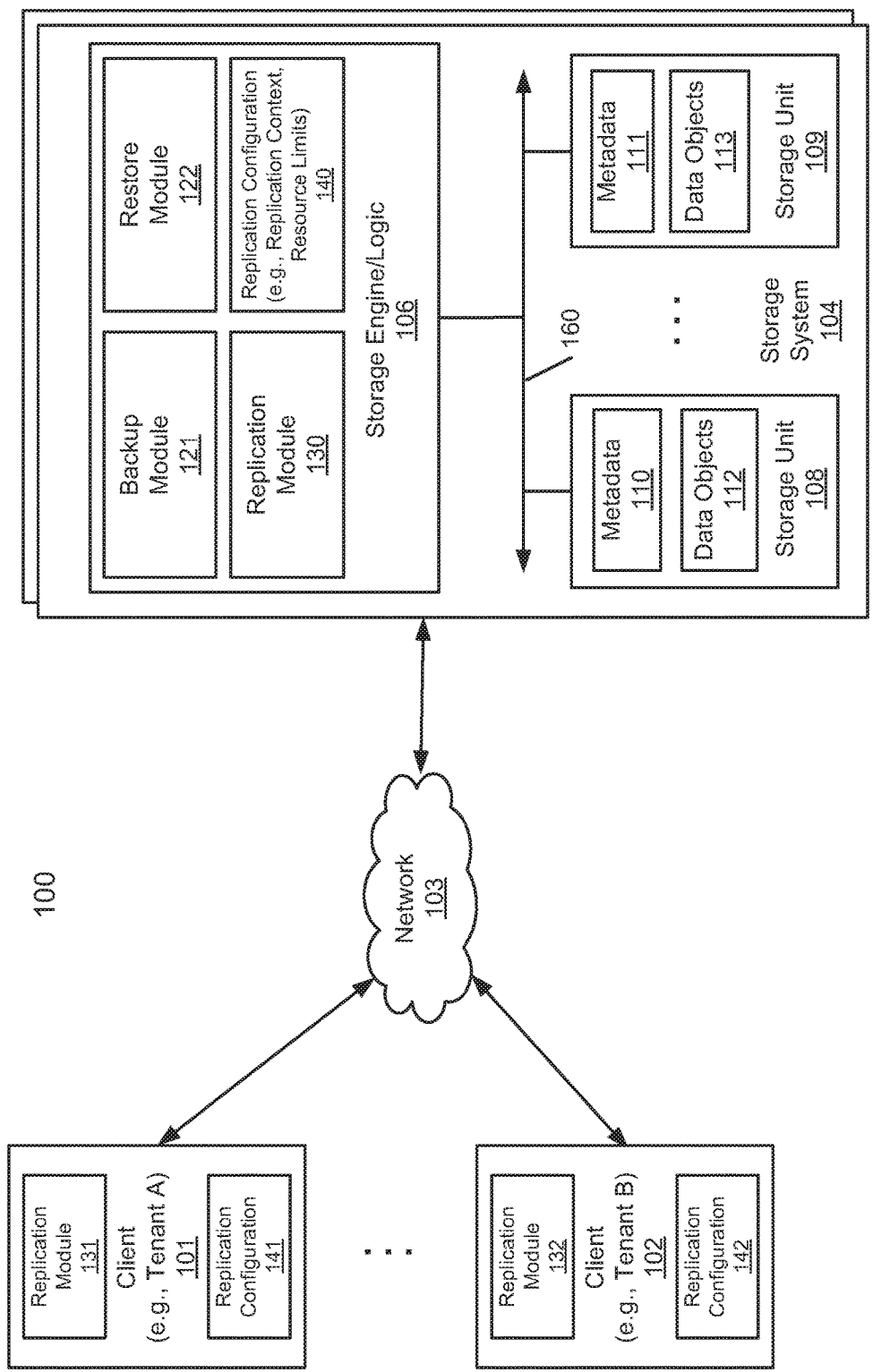
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Further, reference in the specification to "replication resources" and/or "replication resource limits" refer to a wide array of resources and resource limits on the replication target storage system that can include, but are not limited to, a capacity limit and a stream limit per replication configured from the source storage system to the target storage system. The capacity limit represents a storage space limit on the amount of data present on the target that was replicated from the source by a configured replication, and the stream limit is the maximum number of data streams that may be used during replication by a configured replication. According to some embodiments, a configuration is provided at the target storage system, which is owned by a multi-tenanted service provider, to allow a service provider administrator to limit capacity usage consumed on the target storage system by a replication configured from a source storage system, which is not multi-tenanted and not owned by a service provider, by setting a capacity quota at the target storage system. According to other embodiments, configuration is provided at the target storage system, which is owned by a multi-tenant service provider, to allow a service provider administrator to limit the maximum number of streams consumed by the target storage system for a replication configured from a source storage system, which is not multi-tenanted and not owned by a service provider, by specifying/setting a replication stream limit at the target storage system.

As used herein, reference in the specification to "replication request," "data replication/replicated," "replication operations," "replication" or "replication session" means a wide array of operations that can include, but are not limited to, replicating data from a source storage system to a target storage system, where the replicated data can be accessed by both storage systems (e.g., clients, tenants, service providers, administrator, etc.). Note that this list of possible replication operations are exemplary and not intended to be exhaustive.

Figure 3A:
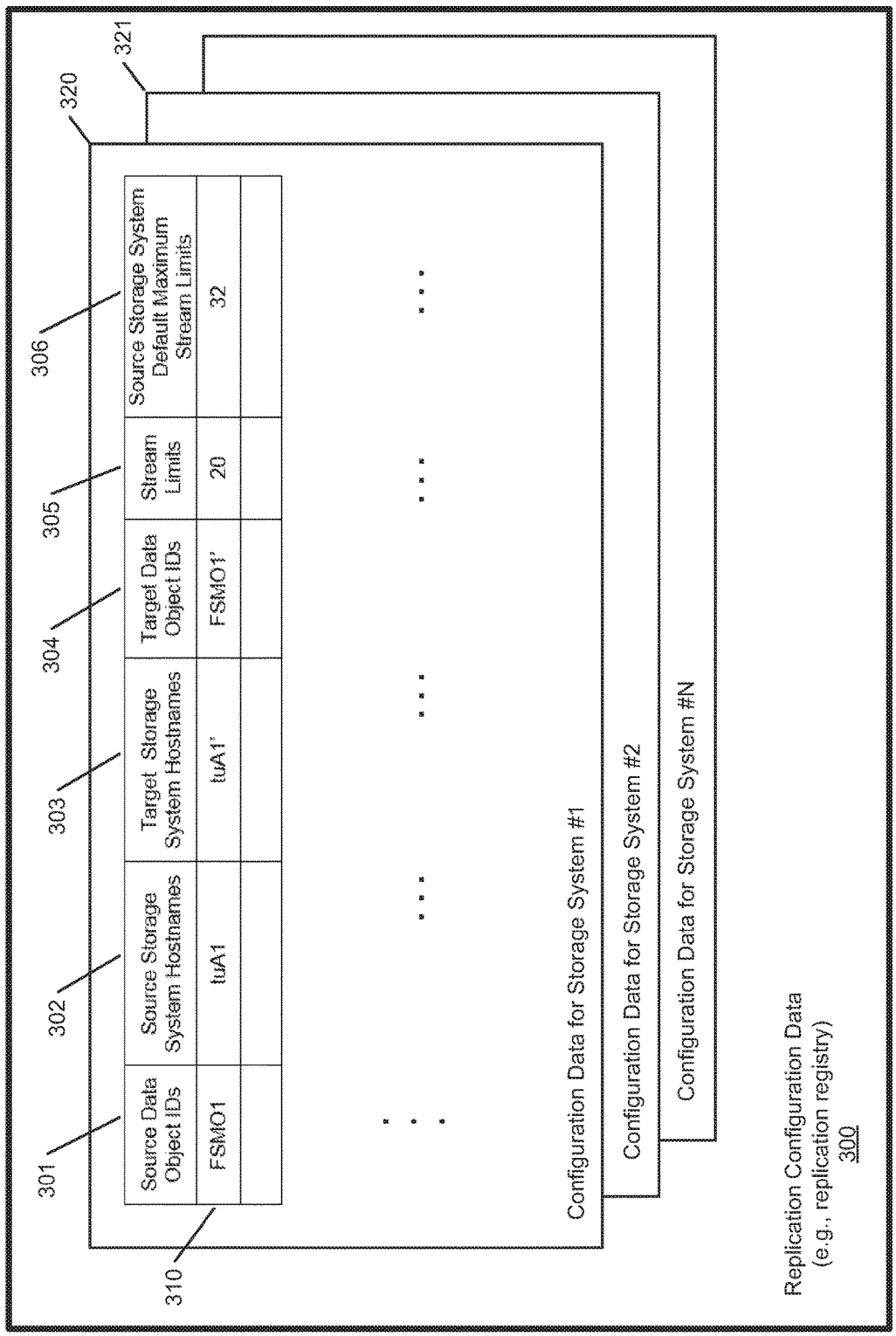
FIGS. 3A-B are block diagrams illustrating examples of replication configuration data of multiple storage systems according to one embodiment of the invention.
Figure 3B:
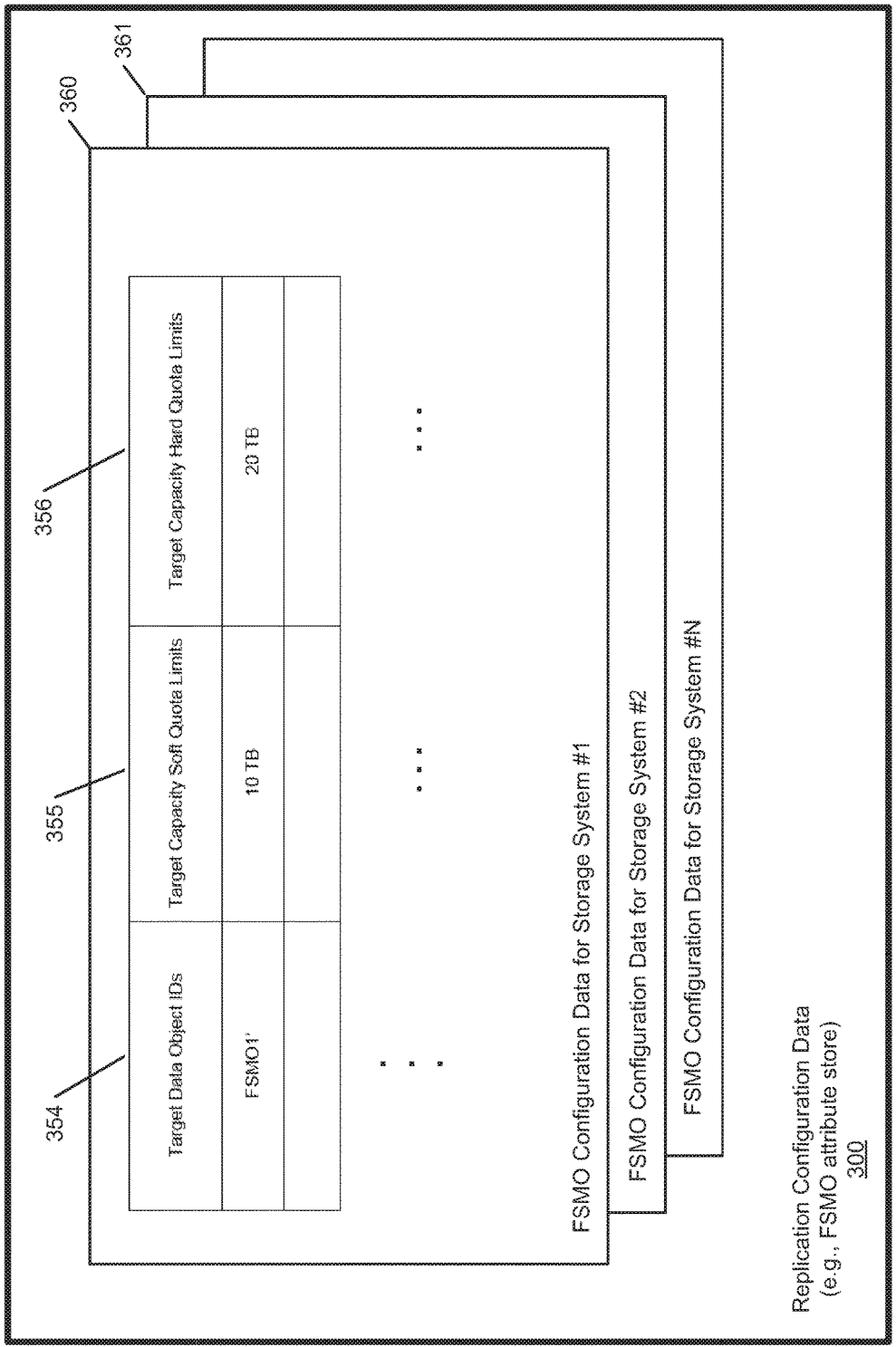

Further, each replication may be defined by a replication context, where the replication context includes, but is not limited to, a source storage system hostname, a source storage system file system management object (FSMO), a target storage system hostname, and a target storage system FSMO (as illustrated in further detail in FIGS. 3A-B). Here, a FSMO (may also be referred to as a segment tree) refers to a file system directory that contains the one or more data objects that are to be replicated. As such, a source FSMO refers to the file system directory that contains the data that is being replicated, and a target FSMO refers to the file system directory that will store the replicated data of the source. According to some embodiments, both the source and target storage systems are configured independently with a replication context, where the source's replication context and the target's replication context contain, for example, the same four replication characteristics (i.e., both the source and target define the same source storage system hostname, source storage system FSMO, target storage system hostname, and target storage system FSMO) to permit the configured replication to be operational.

According to one embodiment, the capacity limits are configured at the target's FSMO and are set independently of any replication configurations (e.g., replication context). In one embodiment, the capacity limit ensures that a specific client (e.g., a source storage system, a tenant, etc.) does not consume all of the capacity, or a disproportionately high capacity at a target storage system, and thereby deny capacity for the other clients/tenants at the target system. For example, the capacity limit may include a capacity soft quota, which ensures that a service provider administrator receives an alert notification if a client's capacity usage on the target storage system exceeds the capacity soft quota set by a service provider. For example, the capacity limit may also include a capacity hard quota that allows the service provider to set an upper bound limit (i.e., a specified capacity number/usage) for the storage capacity used by a client (e.g., tenant) replicating data to a target storage system. The capacity hard quota also ensures that the storage capacity usage that the service provider has set on the target storage system is enforced by terminating a replication session if a replication resource exceeds the capacity hard quota allocated to the data being replicated.

According to one embodiment, the stream limit may be configured in each of the replication contexts (at the source and/or at the destination), where the source and target may have different stream limits in their respective replication contexts. However, according to one embodiment, the source storage system ensures that the correct stream limit is not exceeded by using the minimum of three stream limits (i.e., the source's stream limit, the target's stream limit, and the default maximum stream limit) that are exchanged when the source sends a replication request to the target to perform a replication. Note that if the source storage system is not running a software module (e.g., a replication module) that contains the stream limit feature, then the source storage system will accordingly ignore the stream limit of the replication context that is set at the target storage system.

Further, according to some embodiments, the stream limit ensures that a specific client (e.g., a source storage system, a tenant, etc.) does not consume all of data streams to a target storage system (e.g., a multi-tenanted service provider), or a disproportionately high number of streams used for replicating data to the target storage system, and thereby result in a deficiency of data streams and thus sacrificing the other clients' throughput and performance for replicating data to the target system. For example, the stream limit provides an administrator an option to set a maximum number of streams for a replication context, both at a source storage system and a target storage system, where the replication data stream usage may be limited to the lowest of a stream limit set on either the source or target storage system.

Embodiments of the present invention address data storage systems, in particular, embodiments of the invention relate to replicating datasets that originate at a source storage system with no tenancy considerations, which is not owned by a service provider (SP), to a multi-tenant target storage system that is operated by the SP, where replication resource limits (e.g. capacity limit, stream limit) for each tenant at the target storage system is honored and enforced. For example, the data replication from one or more source storages systems to a target storage system can be configured and efficiently initiated by an administrator via a network connection, or by using removable storage media such as backup tapes or optical storage discs. The embodiments deal generally with identifying, in response to a replication request, a replication resource limit associated with the data to be replicated of the source storage system.

Further, the embodiments also deal generally with determining whether a replication resource requested by the replication request has exceeded a replication resource limit that is associated with the data to be replicated of the source storage system. The embodiments further deal in response to the replication resource not exceeding the replication resource limit, allowing the replication resource to replicate data from the source storage system.

FIG. 1 is a block diagram illustrating a storage system according to one embodiment of the invention. As used herein, a "tenant" refers to the highest unit of abstraction for providing security and logical separation or isolation in a multi-tenant storage system. A tenant also acts as the highest abstraction for allocating and tracking resource utilization by the tenant. As used herein, a "resource" may refer to data such as a file, an object, a workflow, or a directory of one or more files, objects, etc., which is not to be confused with replication resources that refer to capacity usage, stream usage, etc. Alternatively, a resource can refer to a service (e.g., software as a service, storage as a service) provided by a server or a cluster of one or more servers associated with a service provider. As used herein, a "tenant unit" can be a business unit or a group of one or more users (e.g., a human resource department, a finance department, an information technology department, etc.) within an enterprise or corporation (e.g., Tenant A, Tenant B, etc.). A tenant can also refer to an enterprise (e.g., when a storage system/appliance is deployed by a service provider). Note that these tenants, which may refer to source storage system that are not operated by a SP, may be associated with one or more tenant units at a multi-tenant storage system.

Referring now to FIG. 1, system 100 includes, but is not limited to, one or more client systems 101-102 communicatively coupled to storage system 104 over network 103. Clients 101-102 may be any type of clients such as a host or server, a tenant, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a source storage system (e.g., local data center) that provides storage to other local clients, which may periodically replicate the data stored therein to a target storage system (e.g., a multi-tenant service provider, a disaster recovery site or system, etc.), such as storage system 104. Network 103 may be any type of networks such as a local area network (LAN), a wide area network (WAN) such as the Internet, a fiber network, a storage network, or a combination thereof, wired or wireless. Clients 101-102 may be associated with different tenants or different tenant units of a tenant.

In one embodiment, referring to FIG. 1, any of clients 101-102 may further include a replication module (e.g., replication module 131-132). Replication module 131-132 are configured to perform replication operations based on replication configurations 141-142, respectively. For example, when client 101 is about to replicate a data stream (e.g., a file, a segment tree, and/or a directory of one or more files) to storage system 104, replication module 131 is configured to replicate the data stream, where the data stream may be configured into replicated segments (especially when dealing with replicating a large backup directory for example). As used herein, a "segment tree" (also referred to as a dataset) refers to a segment tree of a file that may include one or more nodes and each node represents or references one of the data objects/segments stored in storage units that make up the file.

According to some embodiments as illustrated in FIG. 1, any of clients 101-102 may further include configuration data (e.g., replication configuration 141-142) having at least a portion of configuration data 140. Replication configuration 141-142 are used by replication modules 131-132 to perform replication operations, respectively. Alternatively, replication configuration 141-142 can be configured by an administrator via a configuration interface (e.g., CLI). In one embodiment, each of the replication configuration 141-142 may include a replication resource limit (e.g., a capacity soft quota limit, a capacity hard quota limit, a stream limit, etc.) for replicating data to storage system 104.

Storage system 104 may include or represent any type of servers or a cluster of one or more servers (e.g., cloud servers). For example, storage system 104 may be a target storage system/server used for various different purposes, such as to provide multiple users or client systems a multi-tenant storage system where the client systems can replicate their data, and/or to provide access to replicated data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In embodiment, storage system 104 includes, but is not limited to, storage service engine 106 (also referred to as service logic, service module, or service unit, which may be implemented in software, hardware, or a combination thereof) and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include, but is not limited to, backup module 121 (also referred to as backup logic), restore module 122 (also referred to as restore logic), replication module 130, and replication configuration 140. Replication configuration 140 includes replication context (e.g., source hostnames, source FSMOs, target hostnames, target FSMOs, etc.) and resource limits.

Backup module 121 is configured to receive and back up data from a client (e.g., clients 101-102) and to store the backup data in any one or more of storage units 108-109. Restore module 122 is configured to retrieve and restore backup data from any one or more of storage units 108-109 back to a client (e.g., clients 101-102). Replication module 130 is configured to process a replication request to replicate data from a source storage system and to replicate data from one or more source storage systems (e.g., clients 101-102). For example, replication module 130 may be used to determine whether a source storage system is allowed to replicate data to storage system 104 based on replication configuration 140. According to one embodiment, replication module 130 may be used to enforce a replication resource limit that may be set at replication configuration 140, or a SP administrator may set the replication resource limit directly via a configuration interface.

Storage units 108-109 may be implemented locally (e.g., single node operating environment) or remotely (e.g., multi-node operating environment) via interconnect 160, which may be a bus and/or a network (e.g., a storage network or a network similar to network 103). In one embodiment, storage units 108-109 stores, but is not limited to, metadata 110-111 and data objects 112-113 (e.g., replicated data). Reference in the specification to "data objects" (also referred to as data items) refers to one or more data files or data file locations (such as file directories) stored on a client computer that have been collectively selected to be replicated to a target storage system. Further, a data file can be any type of data file, such as a document file, an image file, an audio file, a video file, a multimedia file, a database or other data structure, a program source code file, an executable program file, a website front-end or back-end component file, a markup file, or any other type of data file that can be stored in a non-transitory computer readable medium.

Storage units 108-109 may include a single storage device such as a hard disk, a tape drive, a semiconductor memory, multiple storage devices such as a redundant array system (e.g., a redundant array of independent disks (RAID)), and a system for storage such as a library system or network attached storage system, or any other appropriate storage device or system. Some of storage units 108-109 may be located locally or remotely accessible over a network.

In response to a data file (e.g., a replicated file) to be replicated and stored in storage units 108-109, according to one embodiment, deduplication logic (not shown) may be configured to segment the data file into multiple segments (also referred to as chunks) according to a variety of segmentation policies or rules. In the event that deduplication logic chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. Data replicated and stored in the file storages may be stored in a compressed form (e.g., lossless compression: Huffman coding, Lempel-Ziv Welch coding; delta encoding: a reference to a chunk plus a difference, etc.). In one embodiment, different storage devices may use different compression methods (e.g., main or active file storages from other file storages, one file storage from another file storage, etc.). The metadata, such as metadata 110-111, may be stored in at least some of storage units 108-109, such that files can be accessed independent of another storage unit. Metadata of each storage unit includes enough information to provide access to the files it contains.

In one embodiment, metadata may include fingerprints contained within data objects 112-113, where a replicated data object may represent a replicated data chunk, a compression region (CR) of replicated data chunks, or a container of one or more CRs. Fingerprints are mapped to a particular replicated data object via metadata 110-111, enabling the system to identify the location of the replicated data object containing a chunk represented by a particular fingerprint.

In one embodiment, the metadata, such as metadata 110-111, information includes a file name, a storage device where the chunks associated with the file name are stored, reconstruction information for the file using the chunks, and any other appropriate metadata information. In one embodiment, a copy of the metadata is stored on a storage device for files, which may or may not be replicated, stored on a storage device so that files that are stored on the storage device can be accessed using only the information stored on the storage device. In one embodiment, a main set of metadata information can be recovered/reconstructed by using information of other storage devices associated with the storage system in the event that the main metadata is lost, corrupted, damaged, etc. Metadata for a storage device can be recovered/reconstructed using metadata information stored on a main storage device or other storage device (e.g., replica storage device). Metadata information further includes index information (e.g., location information for chunks in storage devices, identifying specific data objects, etc.).

According to some embodiments, the replication context and replication resource limits may be configured at the replication module of the source storage system (e.g., replication module 131-132) or at the replication module of the target storage system (e.g., replication module 130). Alternatively, according to another embodiment, the replication context and resource limits may also be configured using a replication management server (not shown), which may be any type of servers or a cluster of one or more servers used for data recovery and replication. For example, this replication management server may be configured to communicate with each of the storage systems, in this example, storage system 104, to configure the storage systems and collect data from them. Replication management server may be associated with a storage provider such as EMC® Corporation that provides the storage appliances, such as storage system 104.

In one embodiment, replication management server can collect various data from the storage appliance devices and analyze them. In another embodiment, replication management server can also, based on the analysis, configure or reconfigure any of the storage appliance devices by sending the configuration information (e.g., in a form of script, extensible markup language or XML, through RESTful APIs) to the devices over a network, such as network 103. Such operations can be performed dynamically without having to shut down or disrupt operations of the storage appliance devices.

Figure 2A:
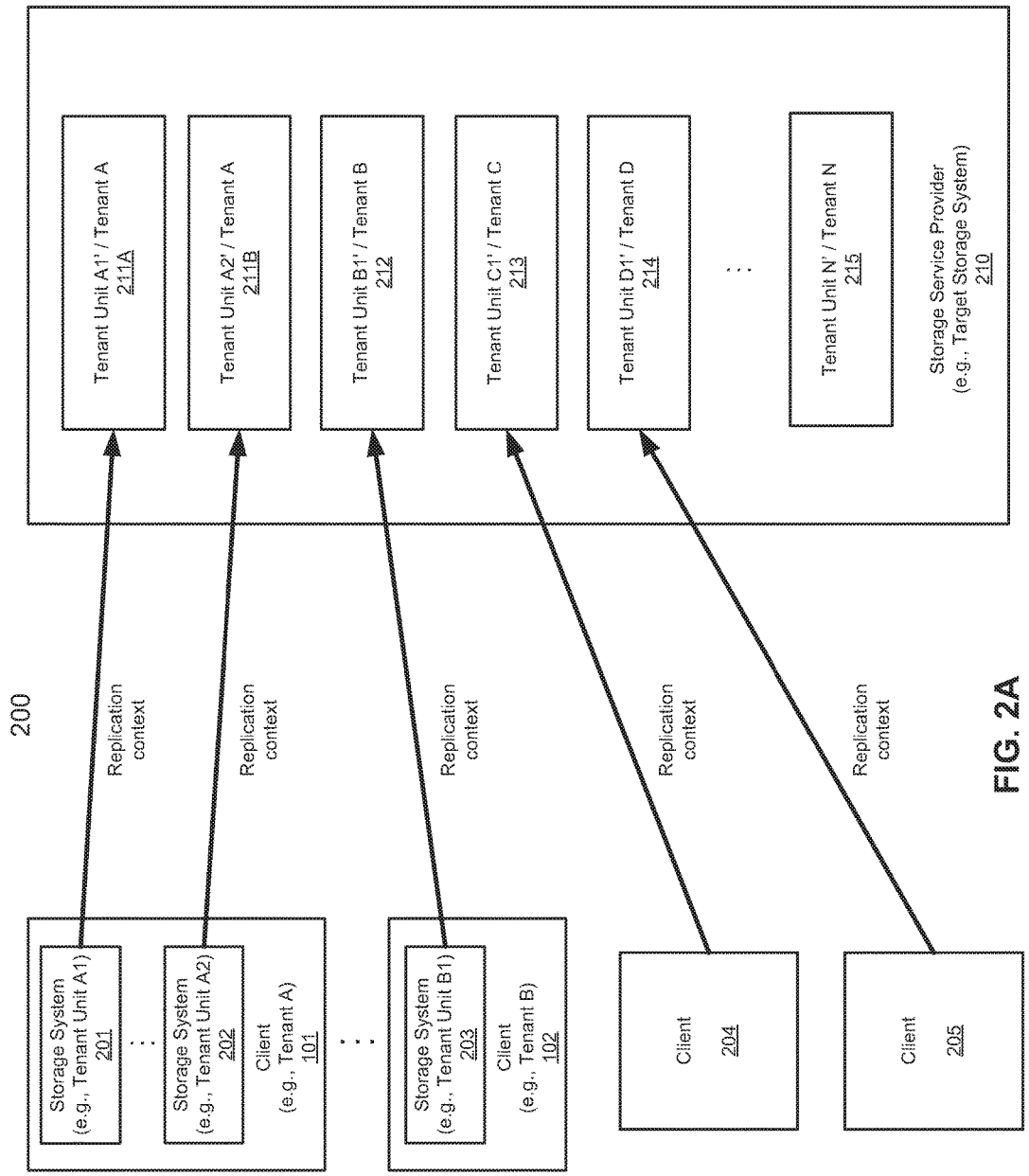
FIGS. 2A-B are block diagrams illustrating replicating data from a set of source storage systems replicating to a target storage system according to one embodiment of the invention.
Figure 2B:
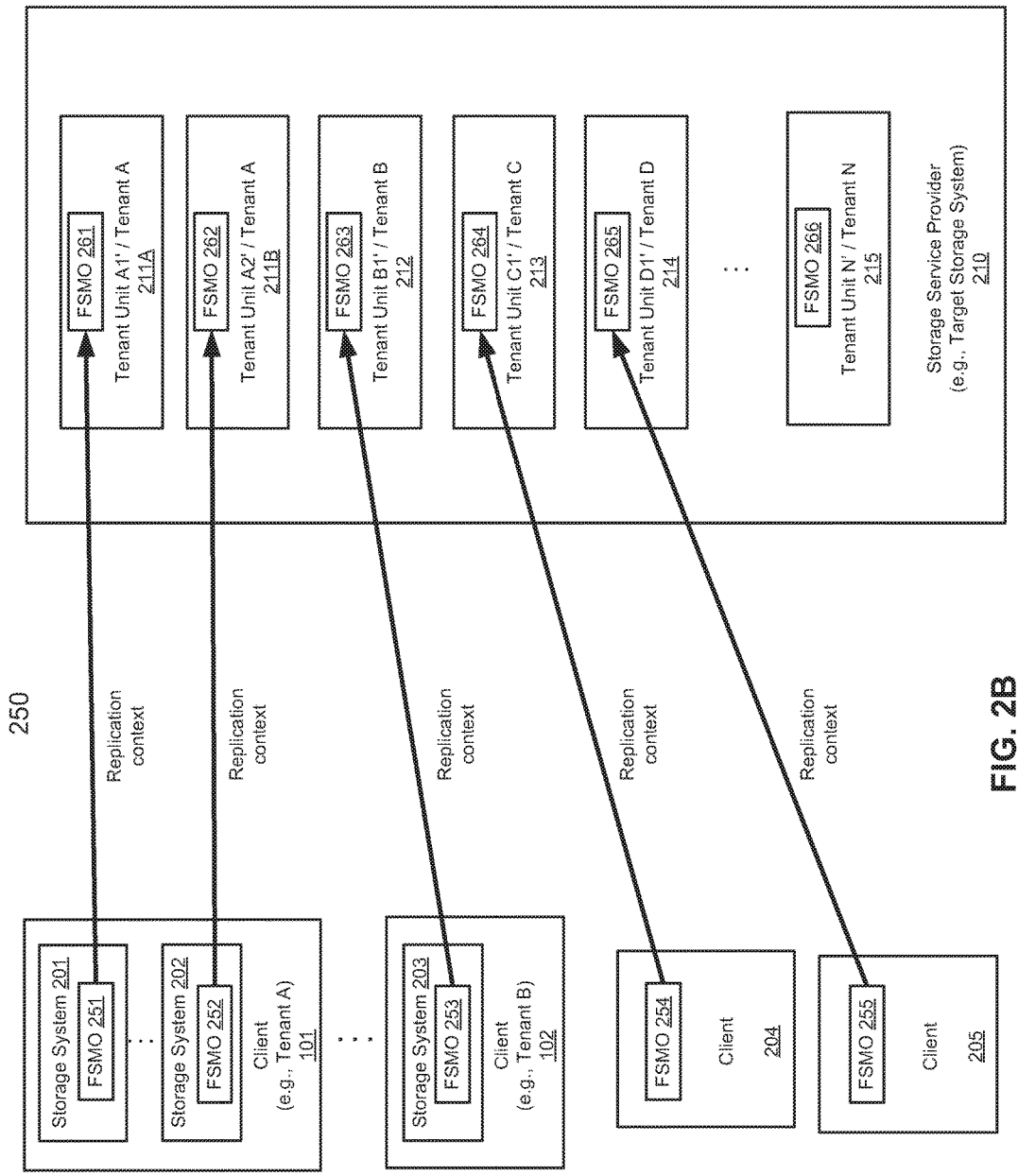

FIGS. 2A-B are a block diagram illustrating one or more source storage systems replicating data to a target storage system according to one embodiment of the invention. According to some embodiments, FIG. 2A illustrates system 200 that includes, but is not limited to, one or more clients 101-102 (e.g., Tenant A, Tenant B) and one or more clients 204-205 communicatively coupled to storage service provider 210 (also referred to as a target storage system). Clients 101-102 and 204-205 are each coupled to storage service provider 210 over a network (e.g., network 103), where the arrows according to FIG. 2A represent one or more replication contexts for replicating data from one or more source storage systems to a target storage system. According to another embodiment, the arrows of FIG. 2A may also represent capacity usage and stream usage from the one or more source storage systems to the target storage system (e.g., storage service provider 210).

According to some embodiments, client 101 includes, but is not limited to, one or more source storage systems (e.g., storage systems 201-202), and client 102 includes a source storage system (e.g., storage system 203). Note that client 102 may include one or more storage systems. For example, client 101 represents Tenant A and client 102 represents Tenant B, meanwhile Tenant A further comprises of storage system 201 and storage system 202, which respectively represent sub-tenants or tenant units A1 and A2. According to another embodiment, clients 204-205 are source storage systems that are not multi-tenanted and not owned by a service provider (e.g., in an asymmetrical secure multi-tenancy manner).

Further, in one embodiment, storage service provider 210 includes one or more tenant units 211-215 (e.g., tenant units A', B', C', D', N', etc.). According to some embodiments, storage systems 201-203 (also referred to as one or more source storage systems) are respectively associated with one or more tenant units 211-212 at storage service provider 210, where replicated data that are stored in storage service provider 210 are associated with storage systems 201-203, respectively. In one embodiment, clients 204-205 are respectively associated with one or more tenant units 213-214 at storage service provider 210, where each client 204-205 configures a replication context to store replicated data from client 204-205 to tenant unit 213-214, respectively. To replicate data from storage systems 201-203 to storage service provider 210 according to one embodiment, a replicator (not shown) replicates data from a source storage system to a target storage system.

As illustrated in FIG. 2A according to one embodiment, storage service provider 210 receives a replication request to replicate data from storage systems 201-203 and clients 204-205. In response to the replication request, storage service provider 210, as a replication target, identifies a replication resource limit (e.g., a capacity limit, a stream limit, etc., not shown) associated with the data to be replicated from storage systems 201-203 and clients 204-205, respectively. Further, storage service provider 210 then determines whether a replication resource (e.g., capacity usage, stream usage) requested by the replication request has exceeded the replication resource limit. As such, in response to the replication resource not exceeding the replication resource limit, storage service provider 210 allows the replication resource to replicate data for each storage system, respectively, unless one of the storage systems may exceed its allocated replication resource limit.

In one embodiment, each of the tenant units (e.g., tenant units 211-215) and clients include at least one FSMO (also referred to as a segment tree) as shown in FIG. 2B. Referring now to FIG. 2B, system 250 illustrates a replication context at the FSMO replication level between a source FSMO (e.g., FSMO 251) and a target FSMO (e.g., FSMO 261). Clients 101-102 and clients 204-205 are respectively associated with source FSMOs 251-255, meanwhile tenant units 211-215 are respectively associated with target FSMOs 261-266. For example, client 101 requests storage service provider 210 to configure and manage data replication via replication context for the FSMOs 251-252 associated with storage systems 201-202 (e.g., Tenant Units A1 and A2) to FSMOs 261-262 at tenant units 211A and 211B (e.g., Tenant Unit A1'/Tenant A and Tenant Unit A2'/Tenant A), respectively. Likewise, client 102 (e.g., Tenant B) requests storage service provider 210 to configure and manage data replication via replication context for FSMO 253 associated with storage system 203 (e.g., Tenant Unit B1) to FSMO 263 at tenant unit 212 (e.g., Tenant Unit B1'/Tenant B). Further, clients 204-205 (e.g., Tenant B) requests storage service provider 210 to configure and manage data replication via replication context for FSMOs 254-255 to FSMOs 264-265 at tenant units 213-214 (e.g., Tenant Unit C1'/Tenant C and Tenant Unit D1'/Tenant D), respectively. Accordingly, replication resources need to be managed and configured, so that neither of storage systems 201-203 disproportionately use the replication resources and thereby impede the capacity and performance (e.g., throughput/RPO/RTO) for the other storage systems at storage service provider 210.

In one embodiment, storage service provider 210 further includes a SP administrator or a SP controller (neither are shown) configured to manage replication resources of storage service provider 210, such as, for example, capacity space, stream usage, and/or processing resources (e.g., processor, memory, network resources, etc.). The SP administrator may access storage service provider 210 by a replication module remotely via a management or configuration interface. The administrator can provision and manage replication resources based on a set of policies, rules, and/or service level agreements. The replication resources can be provisioned, allocated, and/or defined by the SP administrator or automatically by client based on a set of software-defined policies. Each of the replication resources can be provisioned to provide a particular type of replication storage services (e.g., file-based, block-based, object-based, snap-shot based, or HDFS) to a client based on a replication storage policy or service level agreement associated with that particular client as part of software-defined storage services.

FIG. 3A is block diagram illustrating examples of configuration data of multiple storage systems according to one embodiment of the invention. Meanwhile, FIG. 3B is block diagram illustrating examples of FSMO configuration data of multiple storage systems according to one embodiment of the invention. In one embodiment, replication configuration data 300 (also referred to as storage configuration data) includes, but is not limited to, a replication registry (as shown in FIG. 3A) and a FSMO attribute store. According to one embodiment, replication configuration data 300 includes, but is not limited to, configuration data of one or more storage systems 320-321 (e.g., Configuration Data for Storage Systems #1-#N). Each configuration data of a storage system is associated with a table that illustrates source data object IDs 301, source storage system hostname 302, target storage system hostname 303, target data object IDs 304, stream limits 305, and default maximum stream limits 306. The illustrated block diagram is a table, but another block diagram may work equally well, such as a list, a map, and a rational database.

In this example as shown in FIG. 3A, replication configuration data 300 includes configuration data for one or more storage systems 320-321 (e.g., target storage systems). Each configuration data for a storage system includes a list of source data objects 301 (e.g., FSMO1), where each source data object (also referred to as a FSMO and/or a segment tree) is associated with a source storage system hostname 302 (e.g., tuA1), a target storage system hostname 303 (e.g., tuA1'), a target data object 304 (e.g., FSMO1'), a stream limit 305, and a default maximum stream limit 306. In one embodiment, stream limits 305 represents a maximum number of data streams that may be used during replication by a configured replication context. Further, each configuration data for a storage system includes a list of replication context 310, where each replication context includes at least a source data object, a source hostname, a target hostname, and a target data object. In one embodiment, default maximum stream limits 306 are defined defaults for the stream limit of the respective storage system, for example, default maximum stream limits 306 are applicable to a source storage system or target storage system if that respective storage system has not defined its stream limits. Note that if the source storage system and target storage system have not set a stream limit (e.g., stream limits 305), then the source storage system would enforce a default maximum stream limit (e.g., default maximum stream limits 306) that is the maximum number of replication streams associated with the replication context that the source storage system may otherwise use. It is important to note that both at the source, or target, a stream-limit exceeding the default maximum stream limit may not be set.

According to one example, stream limits 305 are consensus driven, and thus the streams 305 configuration data is used by a source storage system to enforce that replication contexts, which are replicating data (e.g., data object 301) from one or more source hostnames to one or more target hostnames, are not exceeding at least one of the stream limits 305, which may include source stream limits and target stream limits, and the default maximum stream limits 306 that are associated to both source and target systems involved with the respective replication context. In one embodiment, configuration data 320-321 may be downloaded to the corresponding target systems.

Referring now to FIG. 3B. In this example as shown in FIG. 3B, replication configuration data is configured at the FSMO level (e.g., target data object IDs 354) to set and enforce capacity limits (e.g., capacity soft/hard quota limits 355-356). According to one embodiment, replication configuration data 300 includes, but is not limited to, FSMO configuration data of one or more storage systems 360-361 (e.g., FSMO Configuration Data for Storage Systems #1-#N). Each FSMO configuration data of a storage system is associated with a table that illustrates target data object IDs 354, target capacity soft quota limits 355, and target capacity hard quota limits 356. The illustrated block diagram is a table, but another block diagram may work equally well, such as a list, a map, and a rational database.

In this example as shown in FIG. 3B, replication configuration data 300 includes FSMO configuration data for one or more storage systems 360-361 (e.g., target storage systems). Each FSMO configuration data for a storage system includes a list of target data objects 354 (e.g., FSMO1'), a target capacity soft quota limit 355, and a capacity hard quota limit 356.

According to other embodiments, the FSMO configuration data is used by a target storage system to enforce replication context, which are replicating data from one or more source hostnames to one or more target hostnames, are not exceeding at least one of the capacity soft quota limits 355 and the capacity hard quota limits 356 that are associated with the target system involved with the respective replication context.

According to some embodiments, for each target data object ID 354, the target storage system enforces capacity soft quota limits 355 and capacity hard quota limits 356 that represent one or more storage space limits (also referred to as capacity usage) for that respective source hostname (e.g., source storage system hostname 302 of FIG. 3A).

In one example, if the capacity usage of the source hostname at the target storage system exceeds capacity soft quota limits 355, the target storage systems then sends an alert notification to a SP administrator, a monitoring entity resource, or directly to the source to provide notice that the source hostname's capacity usage is reaching capacity hard quota limits, which are set as an upper bound limit (i.e., a maximum value for storage space/capacity usage) for the storage capacity space allocated to the source hostname to replicate the source's data objects to the target data object 354 of the target storage system. For example, if the storage space allocated to the source hostname may exceed capacity hard quota limits 356, the target storage system thereby drops the replication context of the source hostname for replicating data from the source's data objects.

According to one embodiment, capacity soft quota limits 355 are set by an administrator to ensure that the administrator receives an alert notification if a source hostname's capacity usage on the target data objects 354 of the target storage system exceeds capacity soft quota limits 355 set by the administrator, which may be monitored by a monitor or replication module, at the target storage system. Note that each limit (e.g., 355-356) may be set by, but is not limited to, an administrator, a replication module, a source storage system, a target storage system, a replication resource manager, a backup/restore manager, etc. Further, capacity hard quota limits 356 allow the administrator to set an upper bound limit (i.e., a maximum value for storage space/capacity usage) for the storage capacity space at target storage objects 354 used by the source hostname that is replicating data from the source's data objects to the target storage system. For example, capacity hard quota limits 356 are enforced by the target storage system by dropping a replication context of replication data (e.g., data identified by source data object IDs 301 of FIG. 3A) if the source hostname's storage space at the target data object 354 of the target storage system exceeds capacity hard quota limits 356. Note that in this example, when the target storage system drops the replicated data, the replicated data of the source hostname will not be exposed to the target's file system namespace.

In another embodiment, for example, a target storage system (e.g., storage system 104, storage service provider 210, etc.) determines whether replication resources (e.g., capacity and/or stream usage) utilized by a replication session/context associated with a replication request of the source hostname to replicate data objects identified by the source's data object to the target data object IDs 354 associated with the target hostname 355 has exceeded at least one of capacity soft quota limits 355 and capacity hard quota limits 356. As a result of the determination, if the replication resource of the source hostname exceeds capacity soft quota limits 355 (e.g., 10 TB), the target storage system sends an alert to the source hostname (i.e., the source storage system) or a monitoring entity resource (e.g., a replication management server, an administrator, etc.) for not honoring the capacity soft quota limit 355 that was set. Alternatively, for example, before exposing the replicated data to a file system namespace at the target, the target storage system determines if the replication resource exceeds capacity hard quota limits 356 (e.g., 20 TB) allocated to the source's data objects being replicated to target data objects 354 of the target storage system. Accordingly, if the target storage system determines that the replication resource may exceed capacity hard quota limits 356, the target storage system drops the replication data and may not allow the replicated data to be exposed on the file system namespace, due to the source hostname not honoring the capacity hard quota limit 356 that was set. Note that as a result of exceeding the capacity hard quota, the source storage system may receive an error message that the replication data is not available at the target storage system.

Figure 4:
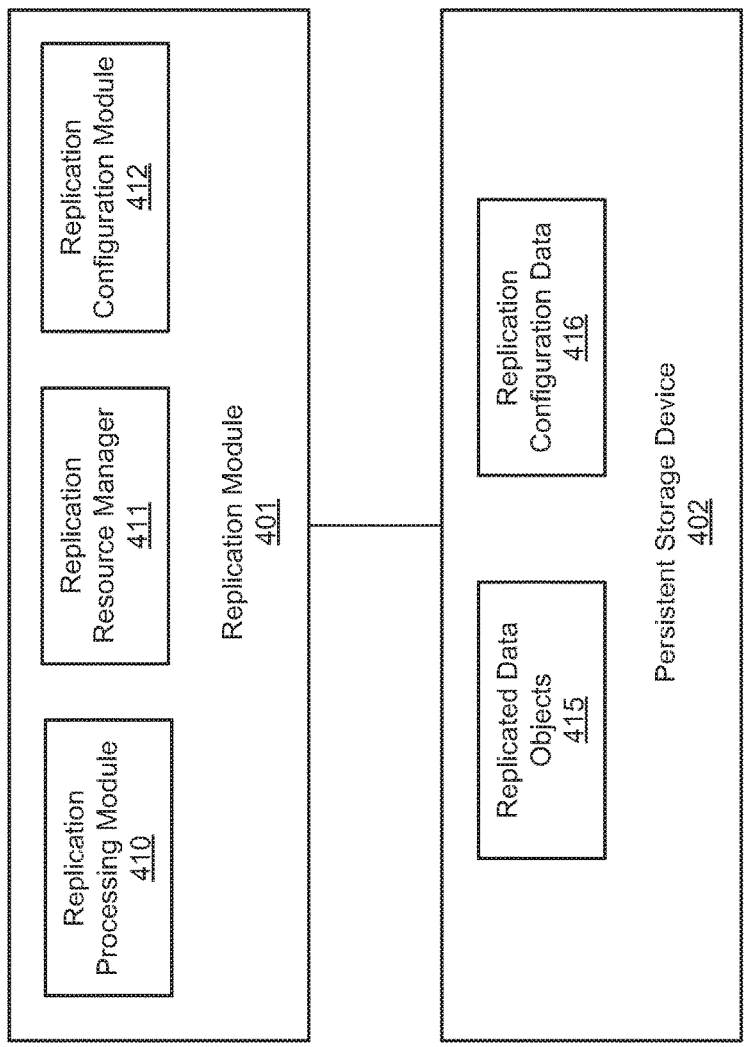
FIG. 4 is a block diagram illustrating a target storage system according to one embodiment of the invention.

FIG. 4 is a block diagram illustrating a target storage system 400 according to one embodiment of the invention. For example, system 400 may be implemented as part of system 104 of FIG. 1. In one embodiment, target storage system 400 includes, but is not limited to, replication module 401 communicatively coupled with persistent storage device 402. According to one embodiment, for example, replication module 410 includes, but is not limited to, replication processing module 410, replication resource manager 411, and replication configuration module 412. Further, according to another embodiment, persistent storages device 402 of the target storage system includes, but is not limited to, replicated data objects 415 and replication configuration data 416. Replication configuration data 416 may include resource limit data similar to those as shown in FIGS. 3A-B, which may be configured via replication configuration module 412 or a replication configuration interface.

To replicate data from a source storage system (e.g., client 101) according to one embodiment, replication module 401 processes a replication request via replication processing module 410 to replicate one or more data objects to replicated data objects 415 of persistent storage device 402. While processing the replication request, replication resource manager 411 determines whether replication resources associated with the replication request exceed one or more replication resource limits, which may be specified in replication configuration data 416 and loaded into memory as part of replication configuration module 412. Accordingly, after processing the replication request and determining that the replication request has not exceeded the replication resource limits, replication module 401 then receives data from the source storage system and stores as replicated data objects 415 of persistent storage device 402.

According to one embodiment, replication module 401 is used to enforce a replication resource limit that is set at replication configuration module 412. Replication configuration module 412 is configured to receive requests to set a replication resource limit at target storage system 400. Replication configuration module 412 then creates the replication resource limit for one or more source storages systems based on the request. According to one embodiment, persistent storage device 402 includes storage replicated data objects 415 and replication configuration data 416.

Figure 5:
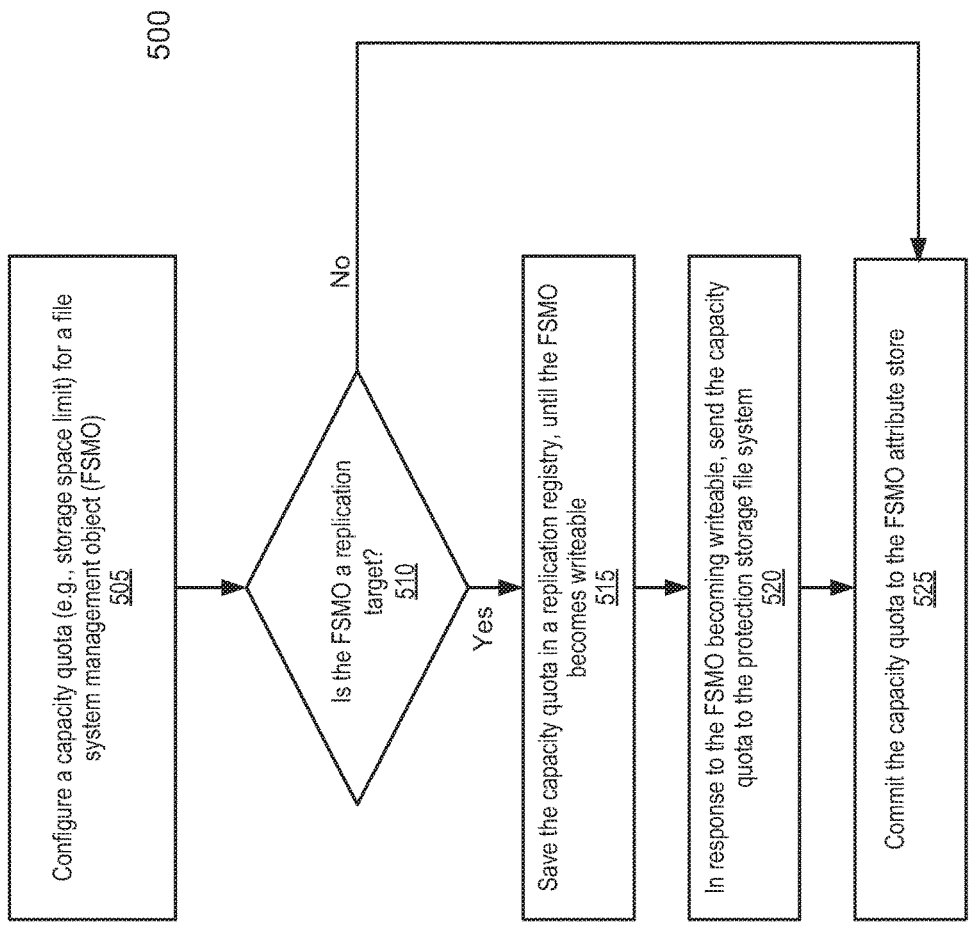
FIG. 5 is a flowchart illustrating a method for enforcing a capacity limit at a target storage system according to one embodiment of the invention.

FIG. 5 is a flow diagram illustrating a process for enforcing a capacity limit at a target storage system according to one embodiment of the invention. For example, process 500 can be performed by a target storage system (e.g., storage system 104, storage service provider 210, etc.), which may be initiated by an administrator that utilizes a replication module. Method 500 can be performed by processing logic which may be implemented in software, firmware, hardware, or any combination thereof.

Referring now to FIG. 5 according to one embodiment, at block 505, a target storage system configures a capacity quota (e.g., storage space limit) for a FSMO, such as a segment trees. The configuration request may be received from an administrator via a configuration interface or alternatively from a replication management server.

At block 510, processing logic of the target storage system determines whether the FSMO is a replication target. If the processing logic of the target storage system determines that the FSMO is not a replication target, the processing logic of the target storage system proceeds to commit the capacity quota to a FSMO attribute store, at box 525. Meanwhile, at block 515, if the processing logic of the target storage system determines that the FSMO is a replication target, the target storage system saves the capacity quota in a replication context registry until the FSMO becomes writeable.

At block 520, in response to the FSMO becoming writeable, the target storage system sends the capacity quota to the protection storage file system. For example, processing logic proceeds to send the capacity quota to the protection storage file system so that the file system that is associated with the replication context is set or reconfigured to the recently saved capacity quota, which represents a new capacity quota being stored at the storage system. At block 525, the target storage system commits the capacity quota to a FSMO attribute store, which is used to store capacity quotas. As used herein, the "FSMO attribute store" is used to persist various attribute values for FSMOs, and the attribute values stored in the FSMO attribute store persist across reboots. For example, the FSMO attribute store is implemented as a FSMO in a Protection Storage File System. In one embodiment, according to the capacity quotas, the values are stored in a registry and when the FSMO becomes writable, the values are then written to the FSMO attribute store.

Figure 6:
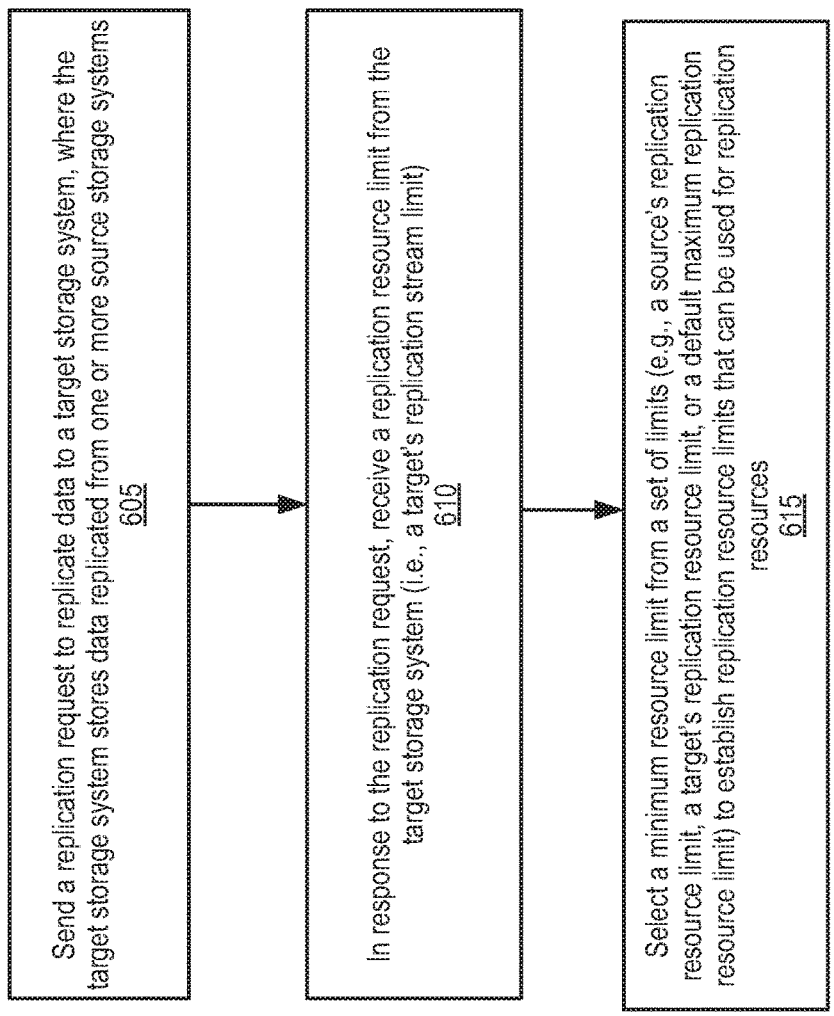
FIG. 6 is a flowchart illustrating a method for replicating data from a source storage system according to one embodiment of the invention.

FIG. 6 is a flow diagram illustrating a method for replicating data from a source storage system according to one embodiment of the invention. For example, process 600 can be performed by a source storage system (e.g., clients 101-102, source storage systems 201-203, etc.), which may be initiated by an administrator that utilizes a replication module. Process 600 can be performed by processing logic which may be implemented in software, firmware, hardware, or any combination thereof.

Referring now to FIG. 6, at block 605, a source storage system sends a replication request to replicate data to a target storage system, where the target storage system stores data replicated from one or more source storage systems. At block 610, in response to the replication request, the source storage system receives a replication resource limit from the target storage system (i.e., a target's replication stream limit).

At block 615, the source storage system selects a minimum resource limit from a set of limits (e.g., a source's replication resource limit, a target's replication resource limit, or a preset maximum replication resource limit) to establish replication resource limits that can be used for replication resources. For example, when replicating data, these established replication resource limits ensure that replication resources, such as data streams, are not disproportionately used by the source storage system.

Figure 7:
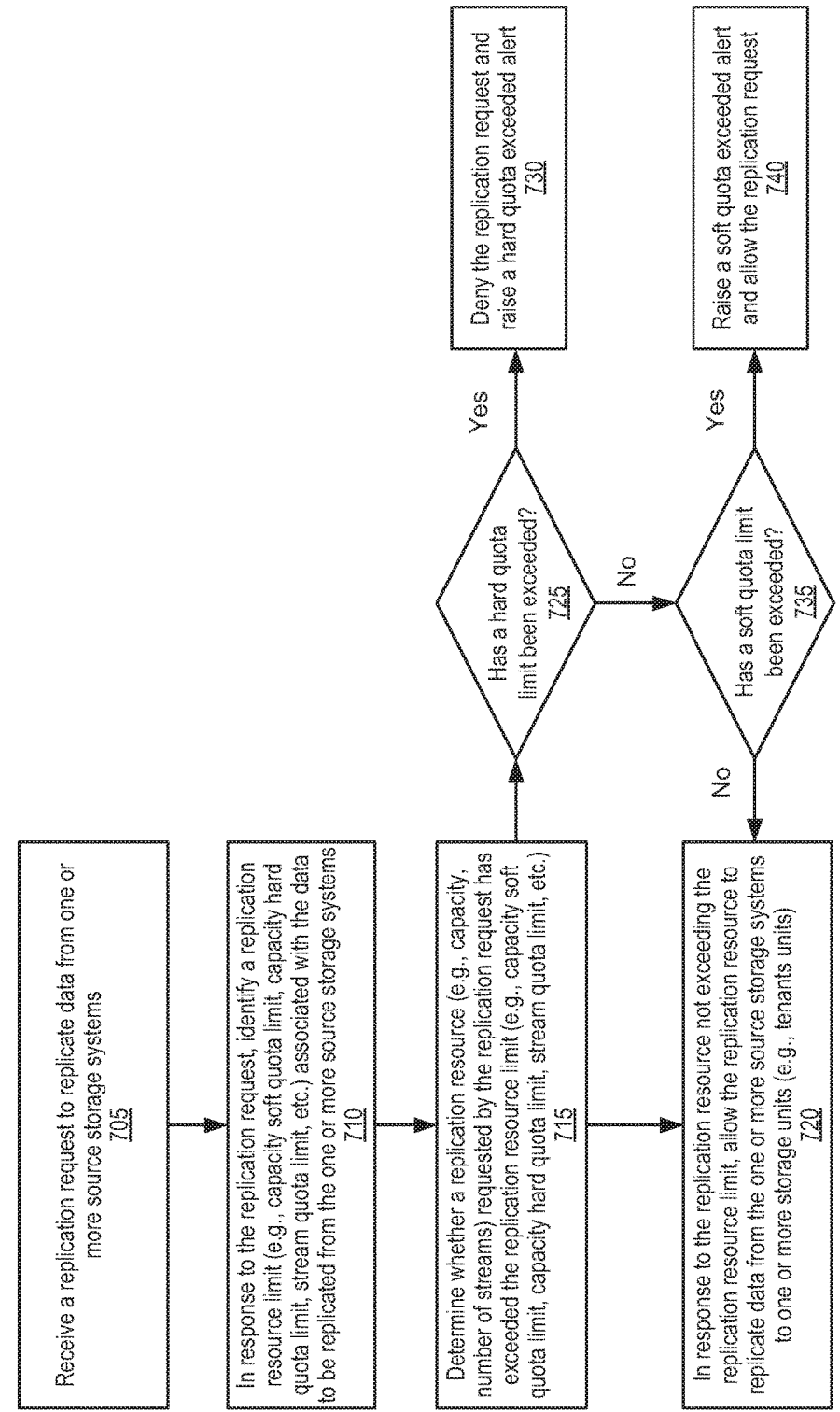
FIG. 7 is a flowchart illustrating a method for replicating data at a target storage system according to one embodiment of the invention.

FIG. 7 is a flow diagram illustrating a method for replicating data at a target storage system according to one embodiment of the invention. For example, process 700 can be performed by a target storage system (e.g., storage system 104, storage service provider 210, etc.), which may be initiated by an administrator that utilizes a replication module. Process 700 can be performed by processing logic which may be implemented in software, firmware, hardware, or any combination thereof.

Referring now to FIG. 7, at block 705, a target storage system receives a replication request to replicate data from a source storage system, where the target storage system stores data replicated from one or more source storage systems. At block 710, in response to the replication request, the target storage system identifies a replication resource limit (e.g., capacity soft quota limit, capacity hard quota limit, stream quota limit, etc.) associated with the data to be replicated from the source storage system.

At block 715, the target storage system determines whether a replication resource (e.g., capacity, number of streams, etc.) requested by the replication request has exceeded the replication resource limit. At block 720, in response to the replication resource not exceeding the replication resource limit, the target storage system allows the replication resource to replicate data from the source storage system to a storage unit of the target storage system.

At block 725, processing logic of the target storage system determines whether a hard quota limit has been exceeded. At block 730, if the processing logic of the target storage system determines that the hard quota limit has been exceeded, then the target storage system denies the replication request and raises a hard quota exceeded alert. For example, the target storage system denies a source's replication request and sends a notification alert to a predetermined monitoring entity (e.g., a SP administrator) when the capacity hard quota has been exceeded. At block 735, if the processing logic of the target storage system determines that the hard quota limit has not been exceeded, then the processing logic of the target storage system determines whether a soft quota limit has been exceeded. At block 740, if the processing logic of the target storage system determines that the soft quota limit has been exceeded, then the target storage system raises a soft quota exceeded alert and allows the replication request. For example, when the capacity soft quota has been exceeded, the target storage system allows the source's replication request but it sends a notification alert to a predetermined monitoring entity (e.g., a SP administrator). If the processing logic of the target storage system determines that the soft quota limit has not been exceeded, the target storage system proceeds to allow the replication request at block 720.

According to some embodiments, referring back to FIG. 2, the techniques described herein can be used in a variety of replication session scenarios for setting and enforcing stream limits. In one embodiment, according to a first scenario, one or more clients (e.g., source storage systems, tenants) and a storage service provider are stored at a cloud storage server, which are controlled by a service provider (SP). According to this embodiment, a tenant sends a request to the SP to create a file system management object (FSMO) (e.g., FSMO for Tenant A) with a specified stream quota at a target storage system and to then replicate the FSMO (i.e., according to an asynchronous multi-tenancy, the SP sets the stream quota on the target, and the tenant may or may not set a stream quota at the source). For example, the tenant's request may be initiated by running a command line (e.g., "FSMO create T_A") via a command line interface (CLI). Accordingly, the SP creates the FSMO and then SP sets the specified stream quota while setting up a replication session via the same CLI command.

Further, a replica FSMO is then created at the target during an initialization phase of the replication session. For example, initially stream quotas for each replication session have a system-wide default setting (e.g., default maximum stream limits 306 of FIG. 3A), which are set as a "default_max_value". The "default_max_value" may be set, for example, at 32, 16, or 8 depending on the type of storage system. At the initialization phase of the replication session, the tenant runs a replication command line (e.g., "repl add source T_A target T_B max-repl-streams X"), where "target source T_A" represents a source storage system, "target T_B" represents a target unit ID, and "X" represents the specified maximum stream quota (also referred to as a stream limit). Accordingly, the target storage system runs/executes the replication command line (i.e., "repl add source T_A target T_B max-repl-streams X"). After this exchange, the replication stream quota for this FSMO for both the source and target storages systems is set to "X" (i.e., the enforced stream limit is "X").

Continuing on with the above example, to initialize the replication session to replicate the FSMO, the tenant runs an initiate replication session command (e.g., "repl init T_B"), where after this command the FSMO is then created/replicated at the target storage system. In one embodiment, the target storage system runs an assign tenant unit command line (e.g., "repl modify T_U_B") to assign the FSMO a tenant unit at the target storage system. Note that the replicated FSMO at the target storage system is read-only according to one embodiment.

Furthermore, according to some embodiments after the specified stream limit has been set at the target storage system, the tenant may send a modify request to the SP to modify the specified stream quota (i.e., "X") for future replication sessions. For example, to reconfigure/modify the specified stream quota, the SP changes the stream quota "X" for both "T_A" and "T_B" and thus an updated effective stream quota is defined as the minimum of newly modified "X" and the "default_max_value".

In another embodiment, according to a second scenario, a tenant operates a source storage system that is not operated by a SP, and meanwhile the SP operates a target storage system (e.g., storage service provider 210). To set and enforce a stream limit according to this embodiment, the tenant creates a FSMO for T_A on its own storage system. Note that the tenant may or may not have a specified stream limit or set the same specified same stream limit or a different stream limit for its own storage system. Accordingly, the tenant issues a command line (e.g., "repl add source T_A target T_B") on the source storage system and also requests that the SP initializes a replication session to replicate the tenant's FSMO (e.g., "m-repl context"). As such, the SP issues a replication command line (e.g., "repl add source T_A target T_B") on the target storage system. Further, the tenant issues an initiate replication session command (e.g., "repl init T_B") to initialize the replication session of the FSMO, where after this command the replicated FSMO at "T_B" is created at the target storage system that is operated by the SP. In one embodiment, the target storage system runs an assign tenant unit command line (e.g., "repl modify T_U_B") to assign the FSMO a tenant unit at the target storage system.

Continuing with the above example, the SP then sets a specified stream limit (e.g., "replication modify T_B max-repl-stream Y") to set the specified stream limit at the target storage system, where "Y" represents the maximum limit for the specified stream limit (i.e., the stream limit). The new stream limit ("Y") will take effect in the following replication session or the following scheduled initialization phase (e.g., "m-rep association phase), which may be defined by the SP. Note that it is possible that the tenant's storage system ("T_A") has no stream limit, thus the effective stream limit to replicate data to the target storage system will then be set to "Y".

Furthermore, according to some embodiments after the specified stream limit has been set at the target storage system, the tenant may send a modify request to the SP to modify the specified stream limit (i.e., "Y") for future replication sessions. For example, to reconfigure/modify the specified stream limit, the SP changes the stream limit "Y" for both "T_A" and "T_B" and notifies the tenant of an updated effective stream limit (e.g., "Z") so that the tenant honors the new stream limit. Note that it is possible that the specified stream limit set by the tenant is lower than the specified stream quota set by SP, as a result the effective stream quota is defined as the minimum of the stream quota as set by the tenants, the SP, and the "default_max_value". For example, if the tenant set the stream quota to 20, the tenant's stream quota is set to 15, and the default_max_value is set at 17, then the effective stream quota that will be enforced at the source storage system is 15.

In another embodiment, according to a third scenario, in a cascading scenario where a storage system is set between two storage systems that implement a specified stream limit, the middle storage system needs to have each replication session manually configured with the specified stream limit—otherwise, a default preset value is used according to this scenario. In another embodiment, according to a fourth scenario, where a new stream quota is being set while a corresponding FSMO snapshot is being replicated to target storage system, in this scenario, for example, the new stream limit will not take effect until the current FSMO snapshot is completed, or when the SP administrator manually terminates the current FSMO snapshot. In another embodiment, according to a fifth scenario, in a concurrent setting when two or more tenants configure the specified stream limit for the same FSMO at the same time, and thus the tenant who has the latest (most recent) stream quota setting wins.

Figure 8:
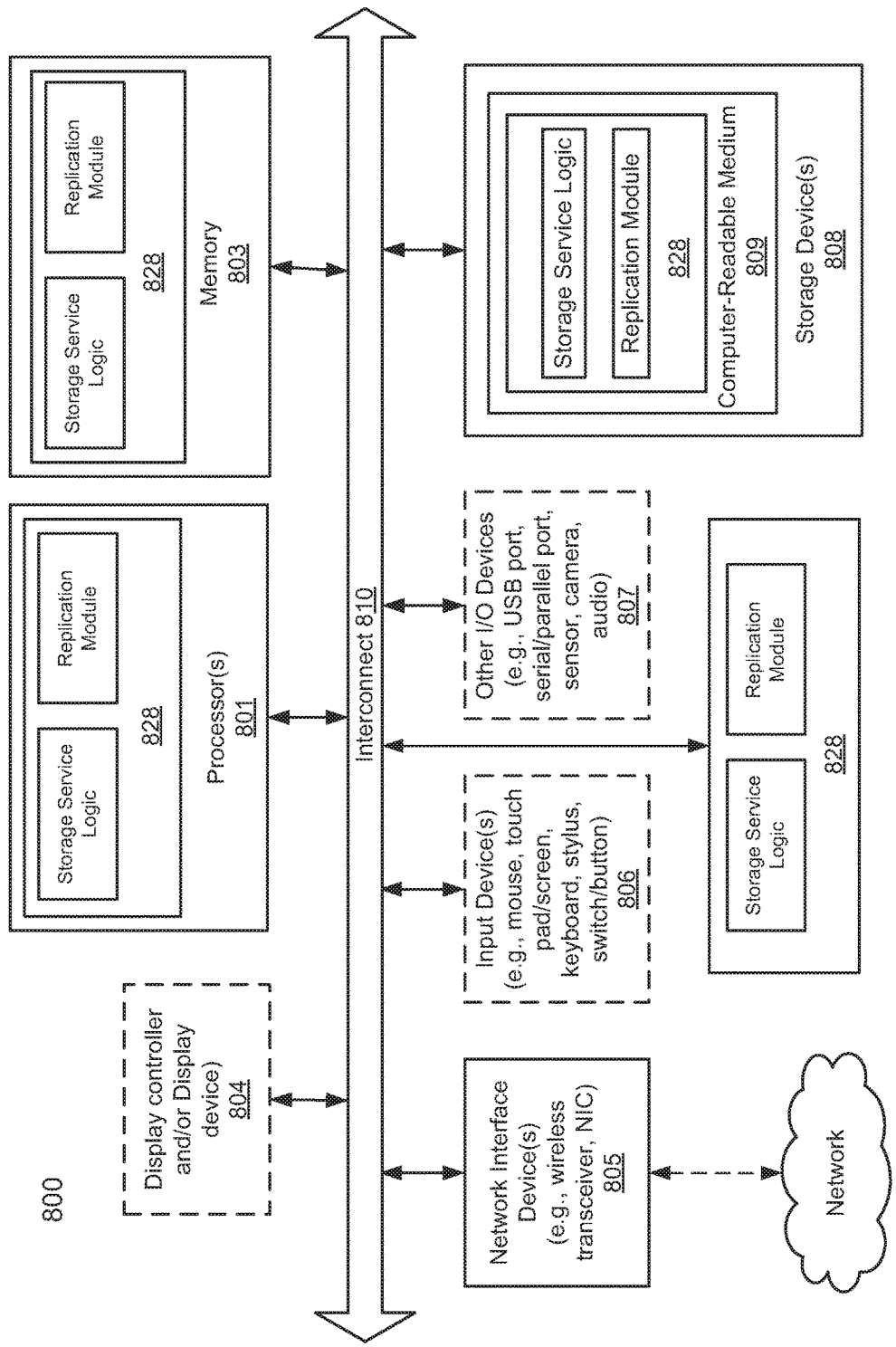
FIG. 8 is a block diagram illustrating a data processing system according to one embodiment.

FIG. 8 is a block diagram illustrating a data processing system according to one embodiment which may be used with one embodiment of the invention. For example, system 800 may represent any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 804-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 804-808, including display device(s) 804, network interface device(s) 805, optional input device(s) 806, and other optional IO device(s) 807, and storage device(s) 808. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., storage service engine, module, unit, and/or logic 828) embodying any one or more of the methodologies or functions described herein. Storage service engine/module/unit/logic 828 that also includes a replication module, may also reside, completely or at least partially, within memory 803 and/or within processor 801 during execution thereof by data processing system 800, memory 803 and processor 801 also constituting machine-accessible storage media. Storage service engine/module/unit/logic 828 may further be transmitted or received over a network via network interface device 805.

Computer-readable storage medium 809 may also be used to store some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 1028 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for replicating data, comprising:
   receiving, at a target storage system, a replication request to replicate data from a source storage system to the target storage system, wherein the target storage system stores data replicated from a plurality of source storage systems;
   in response to the replication request, identifying a replication resource limit associated with the data to be replicated from the source storage system, wherein the replication resource limit includes a capacity limit representing a storage space limit that can be used at the target storage system, wherein the capacity limit includes a capacity soft quota and a capacity hard quota, and wherein the capacity hard quota is set to enforce a maximum capacity limit allocated to the data being replicated;
   determining whether a replication resource requested by the replication request has exceeded the replication resource limit, including
   determining whether the replication resource utilized by a replication session associated with the replication request has exceeded at least one of the capacity soft quota and the capacity hard quota;
   sending a soft quota alert to a predetermined monitoring entity if the replication resource exceeds the capacity soft quota; and
   sending a hard quota alert to the predetermined monitoring entity and terminating the replication session if the replication resource exceeds the capacity hard quota allocated to the data being replicated; and
   allowing the replication resource to replicate data from the source storage system, in response to the replication resource not exceeding the replication resource limit.

2. The method of claim 1, wherein the plurality of source storage systems are associated with a plurality of tenants, and wherein data stored in the target storage system are associated with the plurality of tenants in a multi-tenancy manner.

3. The method of claim 1 wherein the replication resource limit further includes a default maximum resource limit, wherein the default maximum resource limit applies to a source storage system or a target storage system if either storage system has not defined a stream limit quota.

4. The method of claim 1, wherein the replication resource limit further includes a stream limit, and wherein the stream limit is set to enforce a maximum number of streams allocated to a replication session from the source storage system to the target storage system.

5. The method of claim 4, further comprising: determining whether a number of replication streams associated with the replication request has exceeded the stream limit allocated to the data being replicated; and
terminating the replication session if the number of replication streams exceeds the stream limit.

6. A non-transitory machine-readable medium having instructions stored therein, which when executed by a processor, cause the processor to perform operations for replicating data, the operations comprising:
receiving, at a target storage system, a replication request to replicate data from a source storage system to the target storage system, wherein the target storage system stores data replicated from a plurality of source storage systems;
in response to the replication request, identifying a replication resource limit associated with the data to be replicated from the source storage system,
wherein the replication resource limit includes a capacity limit representing a storage space limit that can be used at the target storage system, wherein the capacity limit includes a capacity soft, quota and a capacity hard quota, and wherein the capacity hard quota is set to enforce a maximum capacity limit allocated to the data being replicated;
determining whether a replication resource requested by the replication request has exceeded the replication resource limit, including
determining whether the replication resource utilized by a replication session associated with the replication request has exceeded at least one of the capacity soft quota and the capacity hard quota;
sending a soft quota alert to a predetermined monitoring entity if the replication resource exceeds the capacity soft quota; and
sending a hard quota alert to the predetermined monitoring entity and terminating the replication session if the replication resource exceeds the capacity hard quota allocated to the data being replicated; and
allowing the replication resource to replicate data from the source storage system, in response to the replication resource not exceeding the replication resource limit.

7. The medium of claim 6, wherein the plurality of source storage systems are associated with a plurality of tenants, and wherein data stored in the target storage system are associated with the plurality of tenants in a multi-tenancy manner.

8. The medium of claim 6, wherein the replication resource limit further includes a default maximum resource limit, wherein the default maximum resource limit applies to a source storage system or a target storage system if either storage system has not defined a stream limit quota.

9. The medium of claim 6, wherein the replication resource limit further includes a stream limit, and wherein the stream limit is set to enforce a maximum number of streams allocated to a replication session from the source storage system to the target storage system.

10. The medium of claim 9, further comprising: determining whether a number of replication streams associated with the replication request has exceeded the stream limit allocated to the data being replicated; and terminating the replication session if the number of replication streams exceeds the stream limit.

11. A system, comprising: a processor; and
a memory coupled to the processor for storing instructions, which when executed from the memory, cause the processor to perform operations for replicating data, the operations including: receiving, at a target storage system, a replication request to replicate data from a source storage system to the target storage system, wherein the target storage system stores data replicated from a plurality of source storage systems;
in response to the replication request, identifying a replication resource limit associated with the data to be replicated from the source storage system,
wherein the replication resource limit includes a capacity limit representing a storage space limit that can be used at the target storage system, wherein the capacity limit includes a capacity soft quota and a capacity hard quota, and wherein the capacity hard quota is set to enforce a maximum capacity limit allocated to the data being replicated:
determining whether a replication resource requested by the replication request has exceeded the replication resource limit, including
determining whether the replication resource utilized by a replication session associated with the replication request has exceeded at least one of the capacity soft quota and the capacity hard quota;
sending a soft quota alert to a predetermined monitoring entity if the replication resource exceeds the capacity soft quota; and
sending a hard quota alert to the predetermined monitoring entity and terminating the replication session if the replication resource exceeds the capacity hard quota allocated to the data being replicated; and allowing the replication resource to replicate data from the source storage system, in response to the replication resource not exceeding the replication resource limit.

12. The system of claim 11, wherein the plurality of source storage systems are associated with a plurality of tenants, and wherein data stored in the target storage system are associated with the plurality of tenants in a multi-tenancy manner.

13. The system of claim 11, wherein the replication resource limit further includes a default maximum resource limit, wherein the default maximum resource limit applies to a source storage system or a target storage system if either storage system has not defined a stream limit quota.

14. The system of claim 11, wherein the replication resource limit further includes a stream limit, and wherein the stream limit is set to enforce a maximum number of streams allocated to a replication session from the source storage system to the target storage system.

15. The system of claim 14, further comprising: determining whether a number of replication streams associated with the replication request has exceeded the stream limit allocated to the data being replicated; and terminating the replication session if the number of replication streams exceeds the stream limit.

\* \* \* \* \*